H. S. JORY.
Harrow-Hinge.
No. 206,458. Patented July 30, 1878.
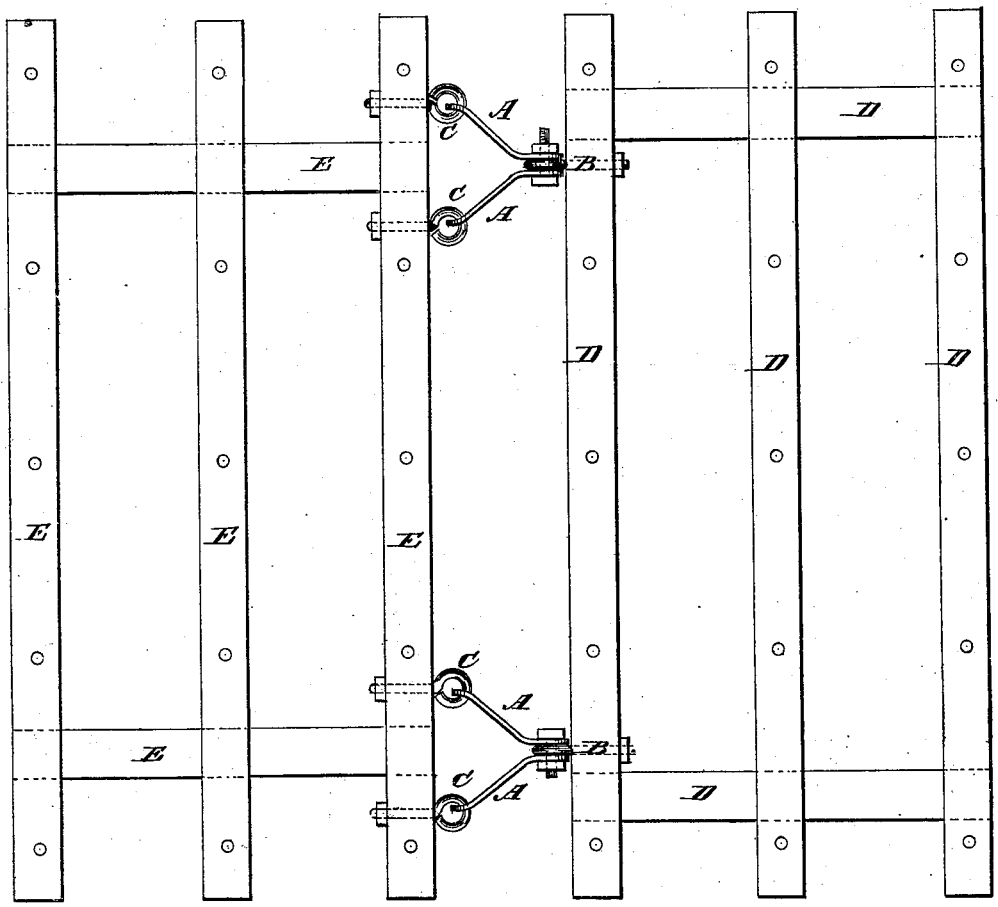
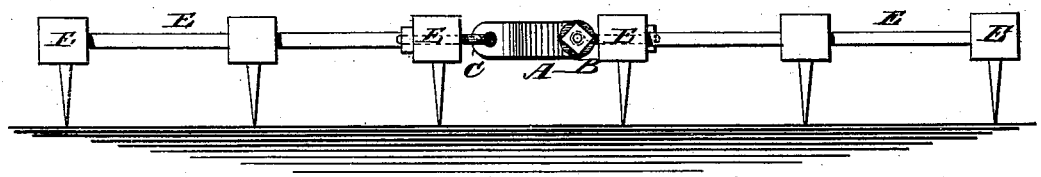

UNITED STATES PATENT OFFICE.

HUGH S. JORY, OF SALEM, OREGON.

IMPROVEMENT IN HARROW-HINGES.

Specification forming part of Letters Patent No. 206,458, dated July 30, 1878; application filed March 19, 1878.

*To all whom it may concern:*

Be it known that I, HUGH STEPHENS JORY, of Salem, in the county of Marion and State of Oregon, have invented a new and useful Improvement in Harrow-Hinges, of which the following is a specification:

Figure 1 is a top view of a harrow to which my improved hinge has been applied. Fig. 2 is an end view of the same.

Similar letters of reference indicate corresponding parts.

The object of this invention is to furnish an improved hinge for the frames of harrows and cultivators, which shall be so constructed as to keep the parts of the frame in proper relative position while allowing the said parts to adjust themselves freely to the surface of the ground, and which will enable the parts of the frame to be readily raised to pass stumps, stones, and other obstructions, and to free the teeth from grass, weeds, and other rubbish, that would clog them and impair their proper operation.

The invention will first be described in connection with the drawing, and then pointed out in the claim.

A are two connecting-bars, the ends of which are pivoted to an eyebolt, B, by means of a small bolt, or in any other convenient way. The eyebolt B is secured to a side bar of a part or section, D, of a harrow-frame. The other ends of the connecting-bars A are spread apart or inclined from each other, and are pivoted to two eyebolts, C, which are secured to the side bar of an adjacent part or section, E, of a harrow-frame. The eyebolts B C are secured to the bars of the frame by nuts or other suitable means.

By this hinge the parts or sections of the frame will be held securely in their proper relative position, and at the same time allowed to rise, fall, and twist, to adjust themselves to the surface of the ground.

Having thus described my invention, I claim as new and desire to secure by Letters Patent—

A two-section harrow consisting of parallel bars E, transversely connected, and having the opposite ends of each section connected by a V shaped hinge-brace, as shown and described.

HUGH STEPHENS JORY.

Witnesses:
C. A. REED,
T. H. COX.